No. 846,599. PATENTED MAR. 12, 1907.
A. NICHOLSON & I. T. RUDE.
AUTOMOBILE FRAME.
APPLICATION FILED OCT. 12, 1906.
2 SHEETS—SHEET 1.
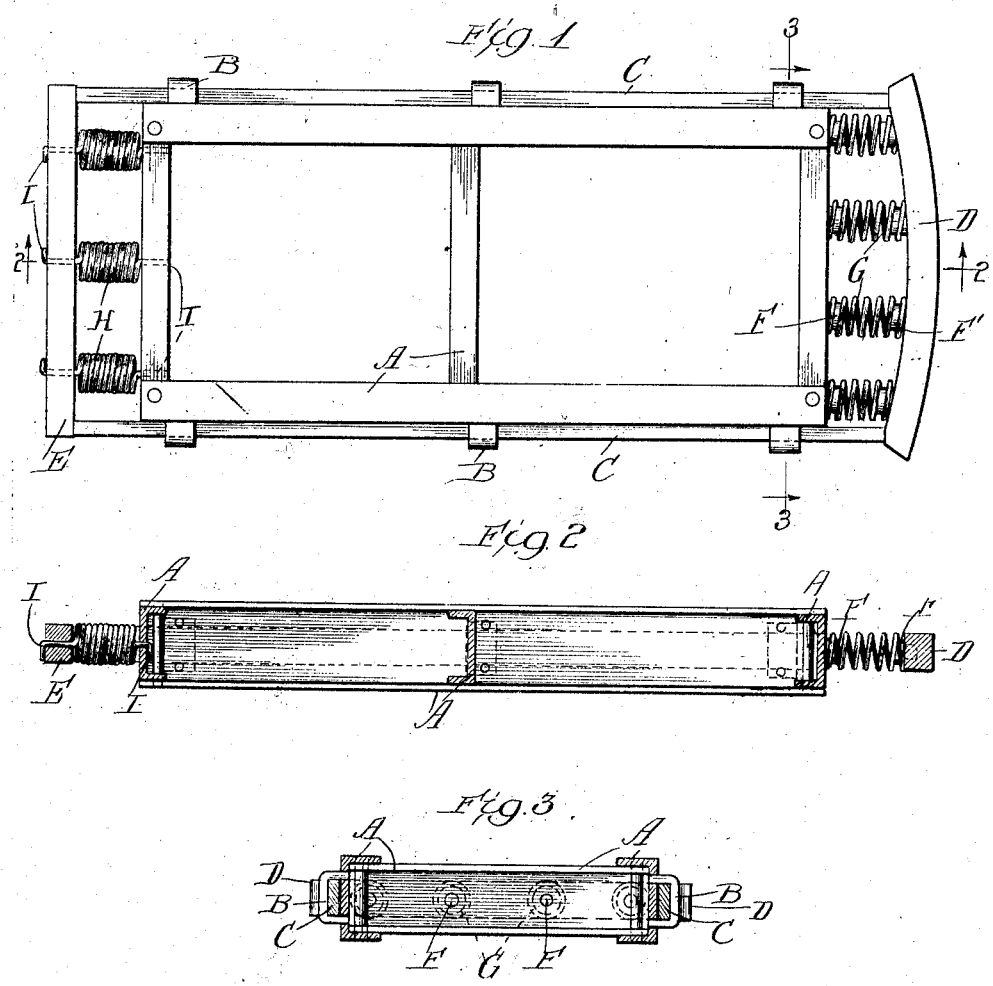
Witnesses:
Harry R. L. White
Ray White
Inventors
Alexander Nicholson
Ingwald T. Rude,
By Morgan & Rubinstein Attys No. 846,599. PATENTED MAR. 12, 1907.
A. NICHOLSON & I. T. RUDE.
AUTOMOBILE FRAME.
APPLICATION FILED OCT. 12, 1906.
2 SHEETS—SHEET 2.
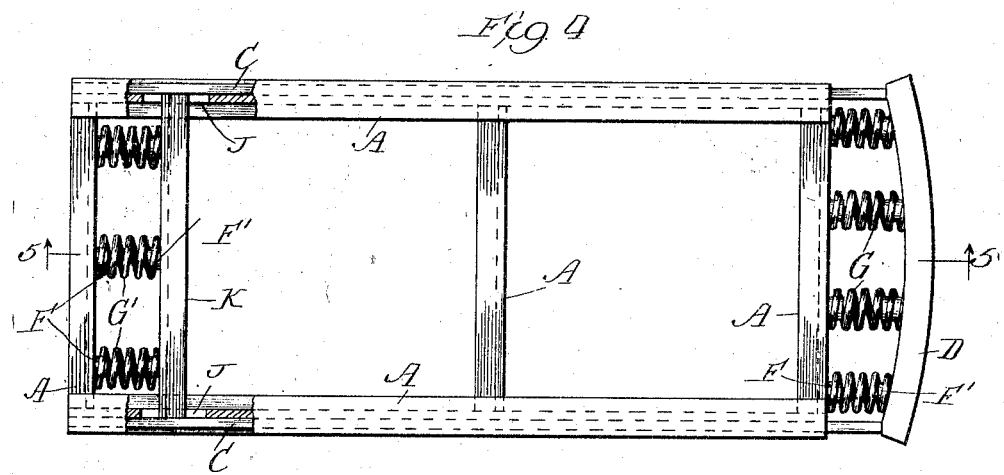
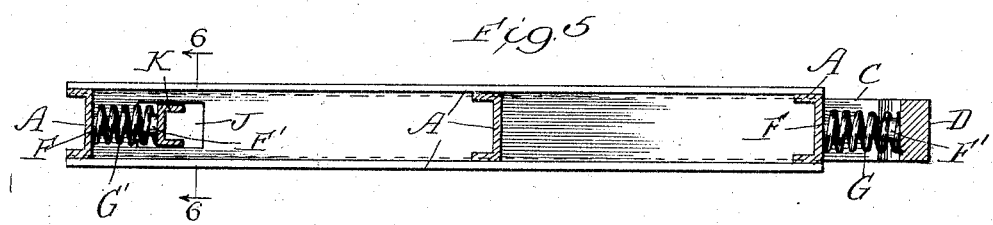
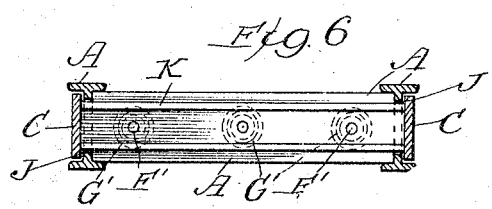
Witnesses:
Harry R. Leslie
Ray White
Inventors:
Alexander Nicholson,
Ingwald T. Rude,
By Morgan & Rubinstein
Attys.

UNITED STATES PATENT OFFICE.

ALEXANDER NICHOLSON AND INGWALD T. RUDE, OF CHICAGO, ILLINOIS.

AUTOMOBILE-FRAME.

No. 846,599.  Specification of Letters Patent.  Patented March 12, 1907.

Application filed October 12, 1906. Serial No. 338,680.

*To all whom it may concern:*

Be it known that we, ALEXANDER NICHOLSON and INGWALD T. RUDE, citizens of the United States, residing at 99 Le Moyne street and 461 North Washtenaw avenue, Chicago, Illinois, respectively, have invented a new and useful Improvement in Automobile-Frames, of which the following is a specification.

Our invention consists in the construction of the main frame to which all parts of the automobile is attached or connected and has no relation or connection with the body, motor parts, or running-gear.

The object of our invention is to provide a buffer which, extending in front of the car, will take up the force of a concussion of sufficient violence to injure the car or occupants, or both, and to so take up the force shock as to reduce or prevent injury therefrom.

The manner in which we accomplish our object is described in the following specification and illustrated in the accompanying drawings, in which—

Figure 1 is a top plan view of our device constructed with compression in front and extension spring in the rear. Fig. 2 is a vertical central section on the line 2 2, Fig. 1. Fig. 3 is a vertical cross-section on the line 3 3, Fig. 1. Fig. 4 is a top plan view of our device with compression-springs at front and rear ends, the rear end springs being within the frame. Fig. 5 is a vertical section on the line 5 5, Fig. 4; and Fig. 6 is a vertical cross-section on the line 6 6, Fig. 4.

In the drawing the frame A, as shown in Figs. 1, 2, and 3, is made of channel-bars riveted or bolted together. Secured in the sides of this frame are a series of staple-guides B. On each side of the frame A, supported in the guides B, are side bars C. Each of these bars is adapted in length to extend at both ends some distance beyond the ends of the frame A. Affixed to the front ends of these bars C is a transverse curved cushion-bar D, and affixed to the rear end of said side bars is a cross draw-bar E. Affixed in the front end of the frame A are a series of projections F, and on the inside of the curved bar D are corresponding projections F'. Supported on these projections and compressed between the bar D and the front end of the frame A are a series of open coiled spring G, adapted to be closed by the opposite movement of said bar and said frame.

In the rear end of the frame A are a series of apertures and a corresponding series of apertures in the above bar E. Between the rear end of the frame A and the bar E are a series of closed coiled springs H, the opposite ends I of which extend through the said apertures in said frame and bar and are secured therein by bending, as shown in Fig. 2. In this form of construction the concussive force imparted to the bar D compresses the springs G, and the movement imparted to the side rods C and end bar E extends the springs H.

In Fig. 4 the sides of the frame A are constructed of I-beams, the shape of which enables us to dispense with the guides B, (shown in Figs. 1 and 3,) the side bars C being slidably adjusted in the recess formed by the head and foot of the I-beam, as shown by the dotted lines in Fig. 4 and in section in Fig. 6. The front cushion-bar D is affixed to the projecting ends of the bar C, and the front end of the frame A and inside of the bar D are provided with a series of projections F and F' and the compression-springs secured thereon, as shown in Fig. 4 and in the first construction. (Shown in Fig. 1.) In the side beams near the rear end are longitudinal slots J. Supported in these slots and slidable therein is a transverse spring-bar K, this bar affixed to the rear ends of the bars C and is moved thereby. Secured between this bar K and the rear end bar of the frame A are a series of open coiled springs A', supported by projections F and F'. This form of construction is more economical in space, construction, and improves the adjustment of the springs. It is obvious that another modification in construction may be made by placing the side bars C and spring-bar K inside the I-beams and extending the front ends of the side bars through suitable apertures in the front end of the frame A and placing the springs between the frame and bar D closer together.

What we claim, and desire to secure by Letters Patent, is—

1. A buffer-frame of the kind described consisting of a main frame constructed of side and end bars, each of said side bars having an aperture near the end of said bars and in line with each other; a series of projections arranged in line on the outside face of each of the end bars of said frame, each of said series of projections being adapted to support the end of a coiled spring; an oblong sliding frame supported on the outside flanges of said main frame, the front end of said frame being curved and extending beyond the end of the main frame, the inside of said curved end being provided with projections corresponding in number and relative position with the said projections on the front end of bar on the main frame, and adapted to support the ends of coiled springs, the end bar of said sliding frame extending through said apertures in the sides of the main frame, and provided on the outer end face with projections corresponding with the projections on the inside of the end of the main frame; a series of coiled springs, said springs being supported on said projections on said main and sliding frames, and compressible between the end bars of said main and said sliding frames as described and for the purposes specified.

2. A buffer-frame of the kind described, consisting of the combination of a main frame oblong in form having sides of I-beams and ends of channel-bars; apertures in the web of said side bars, located near the ends thereof and in line with each other; with a slidable frame of oblong form having sides adapted to fit between and to slide on the outside flanges of said I-beams, the front end of said slidable frame extending beyond the front end of said main frame, and the rear end of said slidable frame extending transversely through said apertures in said I-beams; a series of open-coiled springs supported between the ends of said main frame and the ends of said slidable frame, said springs being adapted to be compressed by the movement of said slidable frame under pressure, as described and for the purposes specified.

ALEXANDER NICHOLSON.
INGWALD T. RUDE.

Witnesses:
THOMAS J. MORGAN,
JOSEPH STAAB.